Figure 1:
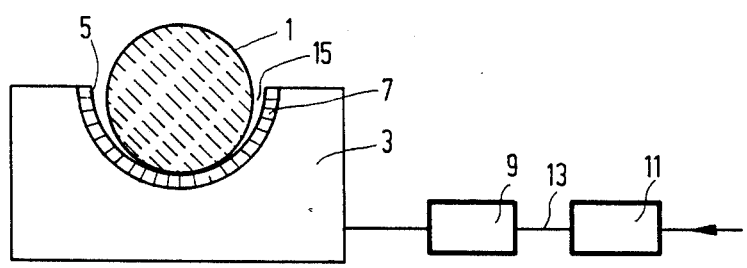

United States Patent [19]
Clasen

[11] Patent Number: 4,866,857
[45] Date of Patent: Sep. 19, 1989

[54] METHOD OF AND ARRANGEMENT FOR DRYING CERAMIC GREEN BODIES

[75] Inventor: Rolf Clasen, Aachen, Fed. Rep. of Germany

[73] Assignee: U.S. Philips Corporation, New York, N.Y.

[21] Appl. No.: 55,571

[22] Filed: May 28, 1987

[30] Foreign Application Priority Data

Oct. 18, 1986 [DE] Fed. Rep. of Germany ........ 3635542

[51] Int. Cl.$^4$ ............................................. F26B 3/10
[52] U.S. Cl. ......................................... 34/10; 34/104; 34/105; 34/57 A
[58] Field of Search ................. 34/10, 57 A, 57 R, 22, 34/107, 156, 236; 406/88

[56] References Cited

U.S. PATENT DOCUMENTS

| | | | |
|---|---|---|---|
| 2,211,490 | 8/1940 | Braun | 34/156 |
| 2,876,079 | 3/1959 | Upchurch et al. | 34/10 |
| 3,062,520 | 11/1962 | Frey et al. | 34/156 |
| 4,000,563 | 1/1977 | Cubitt et al. | 34/10 |
| 4,135,311 | 1/1979 | Imbert | 34/107 |
| 4,439,929 | 4/1984 | Kitagawa | 34/1 |
| 4,690,591 | 9/1987 | Nagashima et al. | 34/236 |

Primary Examiner—Henry A. Bennet
Attorney, Agent, or Firm—Paul R. Miller

[57] ABSTRACT

A method of drying ceramic green bodies, in which the green body is supported by a gas cushion and dried in a suspended position, while employing an arrangement comprising a filtering element which is adapted to the geometry of the green body to be dried, into which filtering element gas, preferably compressed air, can be introduced under pressure by a pipe supply. The gas issues from the filtering element's surface facing the green body to be dried through pore-like apertures which are envenly distributed over the whole surface where they form a gas cushion.

17 Claims, 1 Drawing Sheet

U.S. Patent  Sep. 19, 1989  4,866,857

METHOD OF AND ARRANGEMENT FOR DRYING CERAMIC GREEN BODIES

The invention relates to a method of drying shaped ceramic green bodies and to an arrangement for carrying out such a method.

The method according to the invention relates in particular to drying mechanically sensitive ceramic green bodies on which high demands are made with regard to surface quality and geometry. A particular field of application is the manufacture of long tubes and rods of substances from microdispersed $SiO_2$ powders, which after they have been dried and subsequently purified are sintered into highly pure quartz glass tubes and rods.

In the common methods of manufacturing objects from fine ceramic substances, for example extruding, spin casting, slip casting, electrophoretic deposition, the dispersing liquid, mostly water, must after the moulding process be removed from the deformed green body by subjecting the green body, to a drying process. The drying process may be problematic in that the surface tension of the dispersing liquid may give rise to the development of very large forces between the solid particles of the ceramic substance, and hence to the formation of cracks. Moreover, owing to contraction of the green bodies during drying, stresses develop due to the friction between the mould and the green body (green bodies formed by extrusion are an exception) which are an additional source of cracking.

In general, the formation of cracks is counteracted by adding a suitable binding agent to the ceramic substance, which binding agent provides the green body with the necessary consistency to off set these stresses. Such green bodies may be dried in a free-standing or suspended position. In the case of substances which contain small, submicroscopic particles as a solid, the problem of the formation of cracks during drying the green body becomes worse because the number of contact spots between the individual particles increases rapidly. As smaller solid particles necessarily lead to a reduction in the attainable degree of filling, the green body consistency is also reduced. For this reason, long green bodies can only be dried when they are supported by mechanical means. This is true in particular for green bodies from substances to which no binding agent has been added, and which are formed from aqueous suspensions by cross-linking microdispersed $SiO_2$ powders.

In an example of a method of manufacturing glass bodies according to the present state of the art, a porous green body is formed from the starting material of the glass body in the form of a thixotropic suspension, which is subsequently purified and sintered, in which method the starting material is liquefied in a mould by subjecting it to mechanical forces, and is subsequently freed of the influence of the forces, after which it solidifies again to form a shaped green body. In this example, a suspension is used as the starting material of the glass body, which contains $SiO_2$ particles having a diameter in the range from 10 to 500 nm, preferably from 15 to 100 nm, with an average particle diameter of 40 nm, and water as a dispersing liquid. In such a substance the weight ratio between solid matter and water is in the range from 1:1 to 2.5:1.

In the case of green bodies manufactured according to the above-described method, cross linking of the solid particles initially only takes place through a hydrogen bond of silanol groups which is enhanced by siloxane bonds as the drying process progresses. The solidification of the green bodies can be accredited to the thixotropy effect; this means that the green body can readily be liquefied again by subjecting it to shear stresses.

When mechanical supports, for example, wooden grooves are used for drying green bodies, the surfaces of the green bodies to be dried are damaged when this green body is subject to contraction in the drying process. Moreover, the risk that cracks will develop in long green bodies is very real. In the case of thin-walled tubes a horizontal, mechanically supported drying process may additionally lead to flattening of these tubes and consequently to an undesired change in their geometry. In the case of long green bodies also a free-standing or suspended drying process is unsuitable because the moist green body will become deformed under its own weight or break away from its holding device.

It is an object of the invention to provide a method and an arrangement by means of which mechanically very sensitive ceramic green bodies can be dried without the formation of cracks and without surface damage.

This object is achieved according to the invention, in that the green body is dried in a suspended position while being supported by a gas cushion.

According to advantageous embodiments of the method according to the invention, a desired relative humidity is established in the gas, for example air, introduced into the gas cushion and/or it is given a desired temperature. In this way, the drying rate can be optimally adapted to the various drying phases of the green body, for example, a high constant drying rate during the contraction phase of the green body, a low drying rate during a transitional phase, and again a high drying rate when the contraction phase has ended.

When water is used as the dispersing liquid for the ceramic substance from which the green body to be dried was manufactured, it is particularly advisable to establish a desired relative humidity in the gas used in the gas cushion.

An arrangement for carrying out the method is characterized by a filtering element which is adapted to the geometry of the green body to be dried, into which filtering element gas, preferably compressed air, can be introduced under pressure through a supply pipe, which gas issues from the filtering element's surface facing the green body to be dried through pore-like apertures which are evenly distributed over the entire surface to form a gas cushion.

According to advantageous further embodiments of the inventive arrangement, a humidifier and/or a heating device is arranged in the supply pipe of the gas stream.

According to a further advantageous embodiment of the inventive arrangement, a holding device is provided by means of which the green body to be dried can be held, at least at one end, and preferably rotated. Owing to the possibility of rotating the green body, rotationally symmetrical green bodies can be dried very efficiently on all sides.

In the case of green bodies with smaller dimensions, the green bodies can be made to rotate by suitably influencing the flow ratios of the gas within the gas cushion, for example by suitably orienting a part of the pore-like apertures of the filtering element.

The advantages which can be obtained with the present invention reside in particular in that mechanically very sensitive ceramic green bodies can be dried without the formation of cracks, even when the green bodies are of greater length. Green bodies with contraction percentages in the range from 2 to 20% due to drying were dried without forming cracks. A further advantage of the invention is that in the drying process the surface of the green body remains undamaged; and ceramic, dried green bodies having very smooth surfaces were manufactured with the surface roughness being less than 1 μm.

A further advantage of the method according to the invention, in which use is made of the arrangement according to the invention, is that the ceramic green bodies can be dried quickly and efficiently.

A further advantage is that deformation of the green body during the drying process can be almost completely avoided. This is very important in the manufacture of long quartz glass tubes which are used, for example, as preforms for the manufacture of optical waveguides or for the manufacture of lamp envelopes for, in particular, halogen lamps or gas discharge lamps. In the case of green bodies with a length from 1 to 2 m, deformations of less than 0.1% were measured.

By way of example a description is given of the manufacture and the drying process of a green body which is produced from an aqueous suspension containing $SiO_2$ particles as a solid with the particles having a diameter in the range from 15 to 100 nm, an average particle diameter of 40 nm and a weight ratio between solid matter and water of 1:1.

Figure 2:
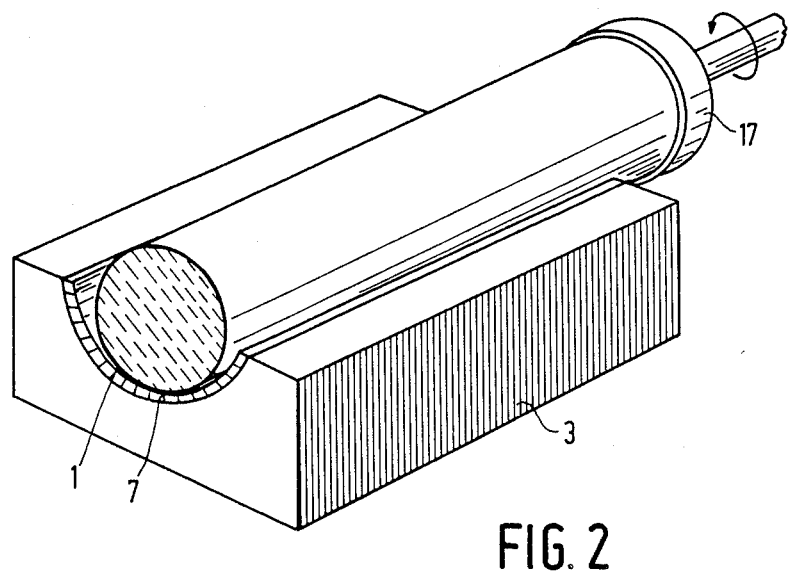

The Figures show:

In FIG. 1 a schematic representation of a drying arrangement according to the invention, In FIG. 2 a schematic representation of a drying arrangement according to FIG. 1 with a rotatable holding device for the green body to be dried.

A green body which is to be dried according to the method of the invention, in which use is made of the arrangement according to the invention, was manufactured as follows: 500 g of commercially available pyrogenic $SiO_2$ with an average particle size of 40 nm are introduced into a glass vessel and dispersed in 425 ml of water and 75 ml of an aqueous ammonium fluoride solution (5%), after which they are homogenized by means of ultrasound (f=35 kHz) until a low-viscous suspension is obtained. This suspension is introduced into a polyethylene terephthalate hose having a diameter of 40 mm and a length of 500 mm. After a rest period of ≈5 hours the suspension in the hose has solidified and the hose is mechanically removed from the solidified green body. However, the hose may also be removed from the green body by chemical means.

The green body thus obtained is subsequently dried by means of an arrangement as schematically shown in FIGS. 1 and 2, where a filtering element 3 is adapted to the geometry of a green body 1 to be dried, which filtering element is provided at the surface 5 facing the green body 1 to be dried with pore-like apertures 7 which are evenly distributed over the entire surface 5. A gas is supplied under pressure through the apertures in the filtering element 3 via a supply pipe 13 which issues gas in the direction of the green body 1 to be dried, thereby forming a gas cushion 15 underneath the green body 1 to be dried. The apertures 7 have an inside diameter of, for example, 1 μm. The filtering element 3 is preferably made of high-grade steel. A humidifier 9 and a heating device 11 have suitably been arranged in the compressed-gas supply pipe 13. A holding device 17 may be provided, by means of which the green body 1 to be dried can be held and rotated at least at one end. The holding device 17 will naturally damage the green body 1 where it contacts the green body, such that this portion of the green body must be cut-off in a later process step, for example, after the green body has dried. In a tubular or rod-shaped green body 1, the filtering element 3 has a curved surface 5 which is adapted to the curvature of the green body 1 to be dried with the radius of curvature of the green body 1 suitably being approximately from 98 to 60% of the radius of curvature of the surface 5. By means of the humidifier 9 a relative humidity of between 10 and 95% can be established in the gas, in particular air, which has been introduced through the gas supply pipe 13, and the gas can be brought to a temperature of between 4° and 95° C. by means of the heating device 11.

A drying process of a green body 1 having a diameter of 40 mm and a length of 500 mm and which is manufactured as described above is carried out as follows: The green body 1 is positoned on the gas cushion 15 which is formed over the surface 5 of the filtering element 3 with the filtering element 3 having a length of 600 mm and its surface 5 having a radius of curvature of 22 mm. The gas which is introduced through the supply line 13 is subjected to an external pressure of 0.6 bar. The temperature of the gas is 24° C. and the relative humidity is 50% during the entire drying process. By means of the holding device 17 the green body 1 is slowly rotated about its longitudinal axis at a rate of 3 revolutions/minute.

After 2.5 hours the contraction phase has ended and the initially dark, still moist green body obtains a white colour. After another 3 hours up to 90% of the water still present in the pores has been removed. Finally, the green body is placed in a drying compartment at a temperature of 80° C. for one more hour.

In this way, a crack-free green body is obtained having a shining and undamaged surface. Deformation of the green body could not be recorded. The diameter of the dried green body was 36 mm.

The dried green body is subjected to a purification process which comprises two stages of 2 hours each, in which in the first stage the green body is purified at 400° C. and in the second stage at 1000° C. in a thionyl chloride/oxygen atmosphere and subsequently sintered in a helium/chlorine atmosphere at a temperature of 1500° C. to obtain a transparent, crack-free quartz-glass rod having a shining surface.

What is claimed is:

1. A method of drying shaped ceramic green bodies comprising the steps of
    suspending a shaped ceramic green body in a suspended state above a device by supplying a cushion of gas from said device, and
    drying said ceramic green body in the suspended state above said device.

2. A method according to claim 1, further comprising the step of rotating said ceramic green body suspended above said device, wherein a holding device is fixed to at least one end of said ceramic green body and provides rotation of said ceramic green body.

3. A method according to claim 1 or claim 2, wherein said gas is provided with a predetermined relative humidity.

4. A method according to claim 3, wherein said gas is heated to a given temperature.

5. A method according to claim 1 or claim 2, wherein said gas is heated to a given temperature.

6. A method according to claim 1 or claim 2, further comprising the step of forming said ceramic green body from an aqueous, thixotropic suspension, wherein said suspension contains SiO$_2$ particles have diameters in the range from 10 to 500 nm, and having an average diameter of 40 nm, and wherein said suspension has a solid:-water weight ratio ranging from 1:1 to 2.5:1.

7. A method according to claim 6, wherein said diameters are in the range from 15 to 100 nm.

8. A method according to claim 1 or claim 2 wherein said gas is provided by air.

9. An arrangement for drying shaped ceramic green bodies comprising
   a shaped ceramic green body,
   a device having a surface with a geometry corresponding to a shape of said ceramic green body, said device having a plurality of pore-like openings evenly distributed completely over the entire surface of said device, and
   means for supplying a gas to said device, said gas issuing through said plurality of openings to provide a gas cushion completely over said surface, said ceramic green body being suspended on said gas cushion.

10. An arrangement according to claim 9, wherein said gas is compressed air.

11. An arrangement according to claim 9 or claim 10, wherein holding means are attached to at least one end of said ceramic green body.

12. An arrangement according to claim 11, wherein said holding means includes means for rotating said ceramic green body.

13. An arrangement according to claim 9 or claim 10, wherein said means for supplying gas includes heating means for heating said gas.

14. An arrangement according to claim 13, wherein said means for supplying gas further includes humidifying means for varying humidity of said gas.

15. An arrangement according to claim 9 or 10, wherein said means for supplying gas includes humidifying means for varying humidity of said gas.

16. An arrangement according to claim 9 or 10, wherein said openings have a diameter of approximately 1 micron.

17. An apparatus according to claim 9 or 10, wherein said green body has a radius of curvature from approximately 98 percent to 60 percent of the radius of curvature of said surface of said device.

* * * * *